(No Model.) 2 Sheets—Sheet 1.

H. C. SMITH.
PROCESS OF AND APPARATUS FOR IMPROVING THE FIRE TEST OF OILS.

No. 268,302. Patented Nov. 28, 1882.

Witness,
M. I. Norton
James A. Maul

Inventor,
Henry C. Smith.
By Geo. W. Tibbitts Atty.

(No Model.) 2 Sheets—Sheet 2.

H. C. SMITH.
PROCESS OF AND APPARATUS FOR IMPROVING THE FIRE TEST OF OILS.

No. 268,302. Patented Nov. 28, 1882.

Witness,
M. E. Axton
James A. Marsh

Inventor,
Henry C. Smith
By Geo. W. Tibbitts, Atty

UNITED STATES PATENT OFFICE.

HENRY C. SMITH, OF CLEVELAND, OHIO.

PROCESS OF AND APPARATUS FOR IMPROVING THE FIRE-TEST OF OILS.

SPECIFICATION forming part of Letters Patent No. 268,302, dated November 28, 1882.

Application filed August 26, 1882. (No model.)

*To all whom it may concern:*

Be it known that I, HENRY C. SMITH, of Cleveland, in the county of Cuyahoga and State of Ohio, have invented a certain new and useful Process of and Apparatus for Improving the Fire-Test of Burning-Oils, of which the following is a specification.

Figure 1:
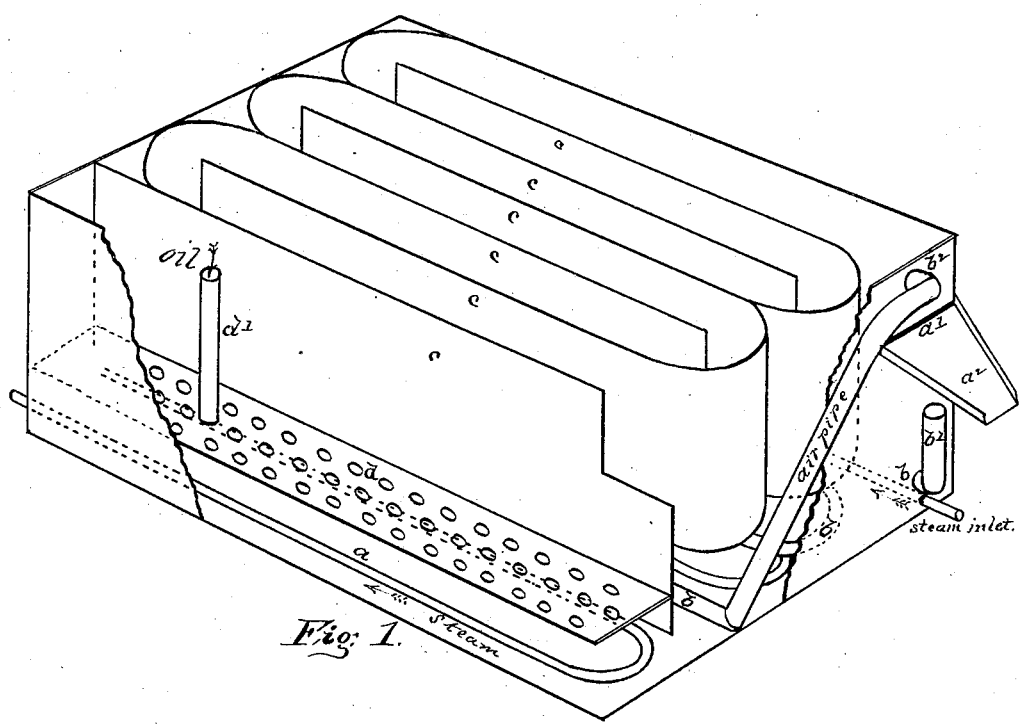
Figure 2:
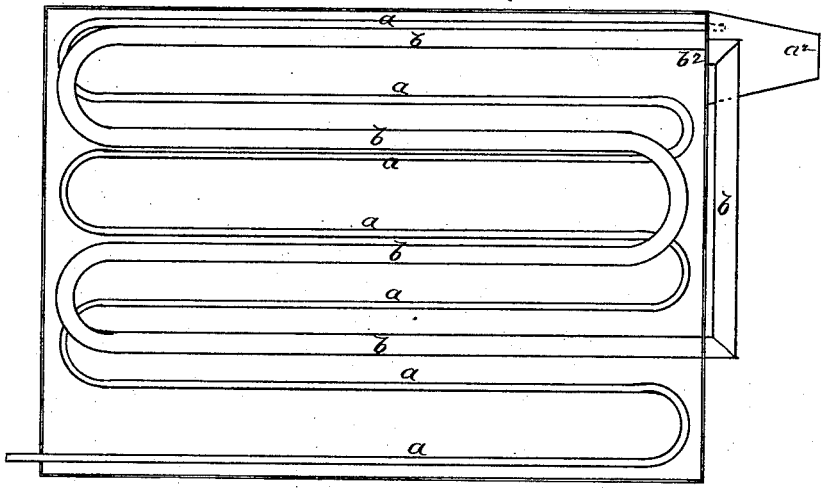
Figure 3:
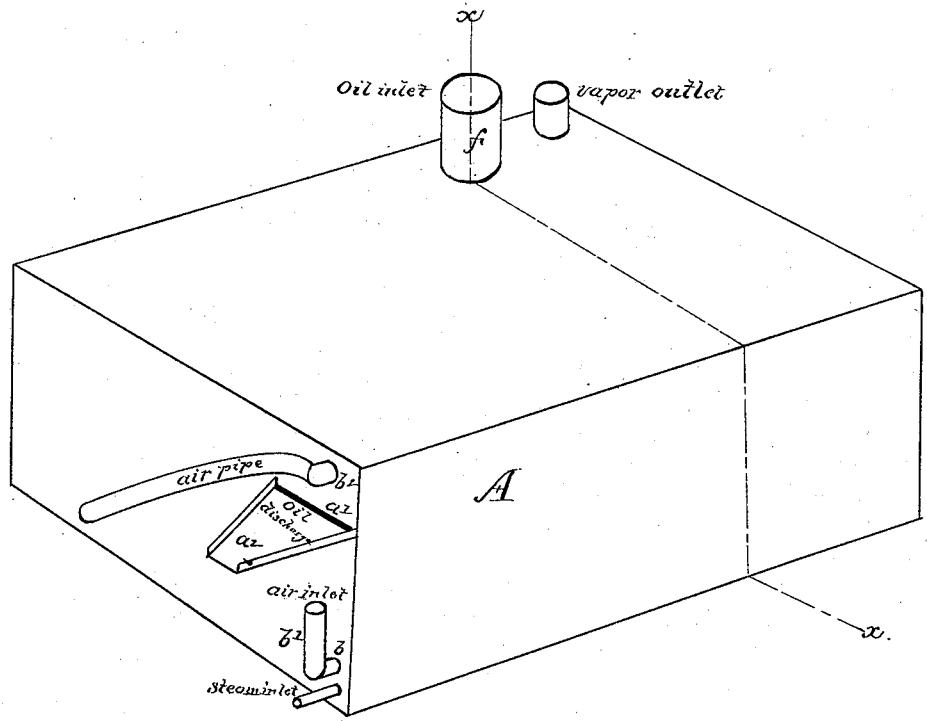
Figure 4:
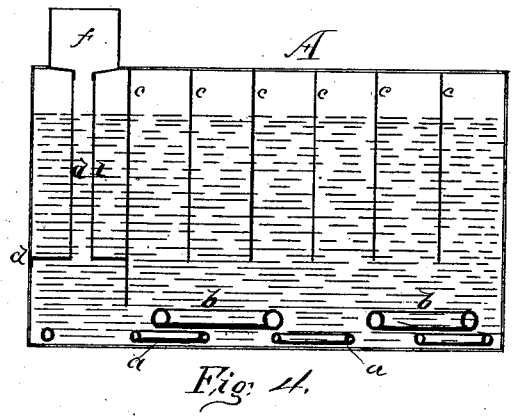

In the accompanying drawings, Figure 1 is a perspective view of my apparatus, having top removed and part of side and end broken away to show interior construction. Fig. 2 is a plan view of bottom, showing arrangement of steam and air pipes. Fig. 3 is an external perspective view, showing inlet for oil and outlet for vapor on the top, and the discharge on the end for the treated oil. Fig. 4 is a cross-section in line $x$ $x$ on Fig. 3.

Heretofore the method of raising and improving the fire-test of burning-oil has usually been to heat the oil in the agitator, after it has been treated, by means of infusion of live steam into the body of the oil until a high degree of temperature is reached, and by means of a blower to agitate the oil until the gases and lighter vapors are driven off. This process is often very tedious, and frequently discolors the oil, and thereby lessens its market value. The cause of the discoloring is in consequence of being under a high degree of heat for too long a time.

My invention consists in floating the oil in a thin layer on the surface of the heated water, allowing it to pass along in a slow current for eliminating the lighter gases and vapors, and passing a gentle current of air over the said layer of oil for conveying off the vapors to be gathered and condensed. The oil thus treated is discharged with a high specific gravity and greatly improved fire-test.

To carry out my invention I make a tank or vessel, A, in the bottom of which is placed a coil of steam-pipes, $a$, having an inlet at one corner and an outlet at the farther opposite corner. Above said coil of steam-pipe is placed a second coil of pipe, $b$, for air, having an inlet at $b'$ at one end of said coil, while the other end of said coil has a discharge into the top of the chamber of tank A at $b^2$. Just beneath this air-discharge $b^2$ is made a slot-opening, $a'$, having a wide slanting spout, $a^2$, for the discharge of the oil after treatment. This discharge-opening is at the water-level in the tank. The interior of said tank is divided by partitions $c$ $c$, which reach from the top down near to the air-pipes $b$, forming a sort of flues having curved ends, and are arranged so as to convey the floating oil in a long continuous current from inlet to outlet. At one side the flue is provided with a false or second bottom, $d$, and is perforated, and is also provided with a pipe, $d'$, connecting the space beneath said bottom with a funnel, $f$, on the top of tank A. The tank is to be filled to the level of the discharge-opening $a'$ with water, and the said water is to be heated by means of steam in the coil of pipe $a$.

The operation of this apparatus is as follows: By heating the body of water in the tank to the required temperature—say 175° to 200° Fahrenheit—and maintaining it at that by means of steam in the pipes $a$, and then admitting the oil in a gentle stream through pipe $d'$, depositing it first under the water, and allowing it to rise therefrom through the perforated bottom $d$ to the surface of the water, and traveling therefrom over a considerable surface of the heated water in a thin layer, the gases and lighter vapors are liberated, and are conveyed off by means of a current of heated air passing over said oil from over its exit at $a'$, and are passed out at the farther corner of the tank, near the point of entrance of the oil, to be collected and condensed, and are thus saved. The oil thus operated upon is not discolored, and the refiner is enabled to produce a whiter oil and of higher gravity than is obtained in the ordinary manner, as the oil is more quickly and thoroughly operated upon. The lighter gravities of oil are made to stand the required test, which fact enables the refiner to produce an oil of higher specific gravity and of lighter color, and of greater market value.

Having described my invention, I claim—

1. The herein-described process for raising and improving the fire-test of oils, the same consisting in passing the oil in a thin layer over a body of heated water and simultaneously passing a current of air over the layer of oil, whereby the light gases and vapors are eliminated from the oil, substantially as described.

2. In an apparatus for improving the fire-test of oils, the combination and arrangement of a closed tank, A, a coil of steam-pipes, $a$, a coil of air-pipes, $b$, in said tank, partitions $c\ c$, and false perforated bottom $d$, the said tank being provided with an inlet, $d'$, a vapor-outlet, and outlet $a'$, the air-pipe connecting with the interior of the tank above the outlet $a'$, substantially as set forth.

HENRY C. SMITH.

Witnesses:
GEO. W. TIBBITTS,
M. G. NORTON.